(12) United States Patent
Purushothaman (10) Patent No.: US 10,574,559 B2
(45) Date of Patent: Feb. 25, 2020

(54) SYSTEM FOR DEFINING AND IMPLEMENTING PERFORMANCE MONITORING REQUIREMENTS FOR APPLICATIONS AND HOSTED COMPUTING ENVIRONMENT INFRASTRUCTURE

(71) Applicant: Bank of America Corporation, Charlotte, NC (US)

(72) Inventor: Sasidhar Purushothaman, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 557 days.

(21) Appl. No.: 15/348,603

(22) Filed: Nov. 10, 2016

(65) Prior Publication Data
US 2018/0131592 A1 May 10, 2018

(51) Int. Cl.
G06F 15/173 (2006.01)
H04L 12/26 (2006.01)
(Continued)

(52) U.S. Cl.
CPC ............. *H04L 43/12* (2013.01); *G06F 11/00* (2013.01); *G06F 16/955* (2019.01); *H04L 43/08* (2013.01); *H04L 67/125* (2013.01); *H04L 43/16* (2013.01)

(58) Field of Classification Search
CPC ......... H04L 43/12; H04L 43/08; H04L 43/16; H04L 43/02; H04L 43/14; H04L 67/125; H04L 63/1408; G06F 11/00; G06F 16/955
(Continued)

(56) References Cited

U.S. PATENT DOCUMENTS 5,506,955 A    4/1996  Chen et al.
6,070,190 A *  5/2000  Reps .................... G06F 11/3495
                                                709/203
(Continued)

OTHER PUBLICATIONS

Purushothaman, Sasidhar; Optimizing the Monitoring of an Enterprise Server Environment; U.S. Appl. No. 14/942,628; filed Nov. 16, 2015.

*Primary Examiner* — Thu Ha T Nguyen
(74) *Attorney, Agent, or Firm* — Michael A. Springs; Moore & Van Allen PLLC; James C. Edwards (57) ABSTRACT

Object automated determination of monitors associated with a component (i.e., application/software, middleware, hardware or the like) that has yet to be implemented within a computing environment infrastructure. Such a determination of the monitors relies on deploying one or more probes that scan through various, if not all, layers of the computing environment infrastructure, such as the hardware, the network, storage, operating systems, virtual layer, middleware, database, application layer, and/or the application to identify possible monitoring requirements. In this regard, the probes scan the environment to determine downstream services that effect the component and the upstream services effected by the component and the set-up/configurations associated with those services. Once the services and corresponding configurations have been identified, the appropriate monitors can be determined. In addition, automated determination of the monitoring configurations associated with the monitors based at least historical behavior/performance of the same or similar components in the computing environment.

18 Claims, 3 Drawing Sheets

(51) Int. Cl.
*G06F 16/955* (2019.01)
*H04L 29/08* (2006.01)
*G06F 11/00* (2006.01)

(58) Field of Classification Search
USPC .................................................. 709/223, 224
See application file for complete search history.

(56) References Cited

U.S. PATENT DOCUMENTS

| | | | |
|---|---|---|---|
| 6,269,401 B1 | 7/2001 | Fletcher et al. | |
| 6,279,034 B1* | 8/2001 | Jarriel | G06F 1/14 709/223 |
| 6,336,139 B1* | 1/2002 | Feridun | G06F 9/542 709/202 |
| 6,363,421 B2* | 3/2002 | Barker | H04L 41/0213 709/202 |
| 6,553,403 B1* | 4/2003 | Jarriel | H04L 41/048 709/202 |
| 6,792,460 B2* | 9/2004 | Oulu | G06F 11/3495 709/224 |
| 6,801,940 B1 | 10/2004 | Moran et al. | |
| 7,028,225 B2 | 4/2006 | Maso et al. | |
| 7,051,098 B2 | 5/2006 | Masters et al. | |
| 7,249,179 B1 | 7/2007 | Romero et al. | |
| 7,418,478 B1* | 8/2008 | Orling | H04L 43/00 709/203 |
| 7,546,353 B2 | 6/2009 | Hesselink et al. | |
| 7,600,014 B2 | 10/2009 | Russell et al. | |
| 7,627,671 B1 | 12/2009 | Palma et al. | |
| 7,685,269 B1 | 3/2010 | Thrasher et al. | |
| 7,752,301 B1 | 7/2010 | Maiocco et al. | |
| 7,761,548 B2 | 7/2010 | Snyder et al. | |
| 7,996,814 B1* | 8/2011 | Qureshi | G06F 11/079 717/120 |
| 8,223,654 B2* | 7/2012 | Bugenhagen | H04L 41/147 370/241 |
| 8,270,952 B2* | 9/2012 | Raleigh | G06Q 10/06375 455/414.1 |
| 8,316,101 B2 | 11/2012 | Ammerlaan et al. | |
| 8,364,802 B1 | 1/2013 | Keagy et al. | |
| 8,505,018 B1 | 8/2013 | Morgan et al. | |
| 8,738,972 B1 | 5/2014 | Bakman et al. | |
| 8,767,686 B2* | 7/2014 | Hoecker | H04W 24/00 370/338 |
| 8,984,506 B2* | 3/2015 | Fletcher | G06F 9/45558 709/223 |
| 8,984,598 B2* | 3/2015 | Branch | H04L 41/28 705/347 |
| 9,081,624 B2 | 7/2015 | Liu et al. | |
| 2004/0064552 A1* | 4/2004 | Chong | G06F 11/3006 709/224 |
| 2005/0027858 A1 | 2/2005 | Sloth et al. | |
| 2008/0046550 A1* | 2/2008 | Mazur | H04L 41/12 709/223 |
| 2008/0059972 A1 | 3/2008 | Ding et al. | |
| 2008/0114570 A1* | 5/2008 | Li | H04L 41/0233 702/186 |
| 2008/0222280 A1* | 9/2008 | Lippincott | H04L 41/00 709/223 |
| 2008/0240150 A1 | 10/2008 | Dias et al. | |
| 2010/0145921 A1* | 6/2010 | Stanley | G06F 16/27 707/706 |
| 2012/0089845 A1* | 4/2012 | Raleigh | H04L 12/14 713/176 |
| 2012/0266231 A1* | 10/2012 | Spiers | H04L 63/0218 726/12 |
| 2013/0275575 A1* | 10/2013 | Hugard, IV | H04L 63/1408 709/224 |
| 2017/0063791 A1* | 3/2017 | Ross | H04L 63/0254 |
| 2017/0093682 A1* | 3/2017 | Kumar | H04L 43/50 |
| 2017/0126705 A1* | 5/2017 | Mirashrafi | H04W 12/06 |
| 2017/0251058 A1* | 8/2017 | Zachariassen | G06F 3/0617 |
| 2017/0302994 A1* | 10/2017 | Kumar | H04L 41/0253 |
| 2017/0339564 A1* | 11/2017 | Momchilov | H04L 63/107 |
| 2018/0096016 A1* | 4/2018 | Bektas | H04L 43/0811 |
| 2018/0124174 A1* | 5/2018 | Swallow | H04L 67/1097 |
| 2019/0129706 A1* | 5/2019 | Vangeel | G06F 8/63 |
| 2019/0132931 A1* | 5/2019 | Sharma | G06F 21/33 |
| 2019/0297078 A1* | 9/2019 | Davis, III | H04L 63/0876 |

\* cited by examiner

SYSTEM FOR DEFINING AND IMPLEMENTING PERFORMANCE MONITORING REQUIREMENTS FOR APPLICATIONS AND HOSTED COMPUTING ENVIRONMENT INFRASTRUCTURE

FIELD OF THE INVENTION

The present invention relates to computing environments and, more specifically, implementing probes to defining monitoring requirements and implementing performance monitoring requirements for applications and hosted computing environment infrastructure.

BACKGROUND

In large enterprises or the like it is essential that all facets of a computing environment function properly on a continuous basis. If a problem is determined to exist (or might exist) it is important that the problem be addressed at the onset so as to mitigate the problem. In this regard, enterprises are tasked with monitoring all facets of the computing environment including, but not limited to, the infrastructure/hardware (e.g., servers, storage devices, PCs or the like), the operating systems, the various layers of the infrastructure (e.g., virtual layer, middleware layer, database layer, application layer) as well as the applications (i.e., software or the like) being executed within the computing environment.

Typically, in practice, a new application, hardware device or the like may be developed and implemented and, once such application, hardware device or the like reaches the production stage, the application, hardware device or the like is continuously monitored to insure proper functioning. However, the choice as to which monitors to use and the thresholds and/or parameters associated with the monitor are often subjectively chosen at the onset of onboarding the new application, hardware device or the like.

For example, a new application may be developed which may require a one or more individuals within the enterprise (e.g., a monitoring team) to define parameters and the like associated with the monitoring needs of the new application. However, the monitoring team typically has knowledge as to application itself, but may not have insight into the layers of the computing environment effected by the application (i.e., so called, upstream affects) and/or layers of the computing environment that have an effect on the application (i.e., so called, downstream affects). As a result, the monitoring team must reach out to other entities within the enterprise associated with the various layers on the computing environment to receive their specific inputs to the monitoring configuration process. Such a highly manual process is not only cumbersome and inefficient, it is also highly subjective because it relies solely on the knowledge held by the individuals and/or team members. Such knowledge held by the individuals and/or team members is not fact-based and, thus, results in inconsistent monitoring. As a result of such inaccurate and/or inconsistent monitoring, critical issues in the computing environment may go undetected and/or unreported or, conversely, false-positives (i.e., detecting/reporting an issue when one does not actual exist) may result based on the wrong selection of which monitors to implement and/or the configuration of the monitors selected (i.e., the thresholds, iterations, and other parameters associated with the monitors.

In addition, the current process for monitoring selection and configuration does not rely on the performance of the existing computing environment and, more specifically, the performance of similar types of applications and/or hardware on the computing environment. For example, the current process fails to refer or otherwise observe the effectiveness of captured parameters associated with similar monitoring performed on similar types of applications and/or hardware nor does the current process compare chosen monitoring configurations to baselines based on previous calibrations to determine the requirements/configurations for the application/hardware being considered for monitoring.

Therefore, a need exists to objectively define monitors and monitor configuration (settings, thresholds, iterations, associated parameters and the like) for newly developed/implemented applications, hardware and the like that is to be deployed in the computing environment. In specific instances, a need exists, to objectively define the monitors and/or monitor configuration prior to actual implementation of the related application/hardware or the like. While in other instances, a need exists to refine the monitors and/or monitoring configuration once the applications, hardware are implemented (e.g., released to test stage/phase, production stage/phase or the like).

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, systems, computer program products for objectively defining monitors associated with a component (i.e., application/software, middleware, hardware or the like) to be implemented with a computing environment infrastructure. The present invention relies on deploying, on demand or the like, one or more probes that scan through various layers of the computing environment infrastructure, such as the hardware, the network, storage, operating systems, virtual layer, middleware, database, application layer, application and the like to identify possible monitoring requirements. In this regard, the probes scan the environment to determine downstream services that effect the component and the upstream services effected by the component and the set-up/configurations associated with those services. Once the services and corresponding configurations have been identified, the appropriate monitors can be determined.

In addition to determining which monitors are required, embodiments of the present invention, determine the monitoring configurations (e.g., thresholds, iterations/cycles, downstream and upstream dependent service parameters and the like) for the identified monitors. Determination of the monitoring configurations may be based on deploying the probes to gauge the effective and/optimal configurations/thresholds and/or historical behavior/performance data associated with the same or similar components implemented in the computing environment. In this regard, the present invention, relies on a learning environment in which the most adequate and/or optimal monitoring configurations can be automatically determined based on historical behavior/performance of other implementations of the specific component and/or other implementations of similar components. Moreover, in further embodiments of the invention, once the monitors have been identified and implemented to assess the performance of the components, further learning based on the historical performance of the component and, in some embodiments historical performance of other same or similar components is relied upon to refine or redefine the monitoring configurations over time so as to insure that the monitors and their respective configurations are accurate (i.e., limit or eliminate the failure to identify a critical issue related to the component and/or a false positive causing an alert/notification to be issued when one is not justified).

A system for defining and implementing performance monitoring requirements within a computing environment infrastructure defines first embodiments of the invention. The system includes a plurality of probes, each probe associated with at least one classification of a component of the computing environment infrastructure and including one or more scripts configured to identify monitors associated with a component of the computing environment. In addition, the system includes a monitor determination module, stored in memory, executable by a processor and configured to deploy one or more of the probes to scan at least a portion of the computing environment and identify one or more monitors associated with a component of the computing environment.

In specific embodiments of the system, the plurality of probes are further configured to identify monitors with respect to which layers of the computing environment the probes are deployed. In this regard, in accordance with further related embodiments of the invention, the monitor determination module is further configured to deploy one or more of the probes to scan an entirety (i.e., all of the layers) of the computing environment, wherein an entirety includes at least a computing environment infrastructure including the network, hardware devices, storages; one or more operating systems; a virtual layer, a middleware layer, a database layer, an application layer and one or more applications. In still further related embodiments of the system, the monitoring determination module is further configured to determine one or more portions (e.g., layers) of the computing environment to scan based at least on a type/classification of the component of the computing infrastructure associated with the monitoring.

In other specific embodiments of the system, the monitoring determination module is further configured to determine the one or more of the probes based at least on a type or classification of the component of the computing infrastructure associated with the monitoring.

In additional specific embodiments of the system, the plurality of probes are further configured to identify monitors associated with the component by determining one or more upstream services effected by the component of the computing environment and/or downstream services that effect the component and a configuration of the one or more services. In such embodiments of the system, the monitor determination module is further configured to identify the one or more monitors associated with a component of the computing environment by determining the one or more upstream services effected by the component of the computing environment and/or downstream services effected by the component and a configuration of the one or more services.

In additional embodiments of the system, the plurality of probes include non-intrusive probes and intrusive probes (i.e., probes that are configured to require an authentication mechanism in order to scan the at least a portion of the computing environment).

In still further embodiments of the system, the monitor determination module is further configured to combine the one or more identify monitors to determine a set of monitors to apply to the component of the computing environment.

Moreover, in other specific embodiments of the system, the monitor determination module is further configured to determine configuration settings for at least one of the one or more identified monitors. In such embodiments of the system, the monitor determination module is further configured to determine the configuration settings based on the component of the computing infrastructure associated with the monitoring and accessing a performance monitoring database to assess historical performance data associated with a same component of the computing infrastructure or a similar component of the computing infrastructure. In specific related embodiments of the system, the configuration settings may include, but are not limited to, monitoring thresholds that trigger an action, number of monitoring cycle/iterations that trigger an action and/or one or more downstream or upstream dependent services parameters/settings that require monitoring in response to a monitoring threshold being met or exceeded after one or more predetermined monitoring cycle iterations. In such embodiments of the system the action that is triggered may include at least one of notifying one or more entities associated with the computing environment infrastructure or monitoring additional downstream or upstream dependent services in the computing infrastructure.

In still further specific embodiments the system includes a monitoring learning module, stored in memory, executable by a processor and configured to learn, over time, monitoring performance data associated with one or more of the identified monitors that have been applied to the component and refine configuration settings associated with the component based on the monitoring performance data.

An apparatus for defining and implementing performance monitoring requirements within a computing environment infrastructure defines second embodiments of the invention. The apparatus includes a computing platform including a memory and at least one processor in communication with the memory. The apparatus further includes a monitor determination module that is stored in the memory and executable by at least one of the one or more processors. The module is configured to configured to deploy one or more of a plurality probes to scan at least a portion of the computing environment and identify one or more monitors associated with a component of the computing environment, wherein each of the probes are associated with at least one classification of a component of the computing environment infrastructure, and including one or more scripts configured to identify monitors associated with a component of the computing environment.

A computer program product for defining and implementing performance monitoring requirements within a computing environment infrastructure that includes a non-transitory computer-readable storage medium having computer-executable instructions defines third embodiments of the invention. The computer-executable instructions are configured for deploying one or more of a plurality probes to scan at least a portion of the computing environment, and, in response to the scan, identifying one or more monitors associated with a component of the computing environment by determining the one or more upstream services effected by the component and/or downstream services that have an effect on the component and a configuration of the one or more services in the computing environment.

Thus, systems, apparatus, and computer program products herein described in detail below provide for objectively defining monitors associated with a component (i.e., application/software, middleware, hardware or the like) to be implemented with a computing environment infrastructure. The present invention relies on deploying, on demand or the like, one or more probes that scan through various layers of the computing environment infrastructure, such as the hardware, the network, storage, operating systems, virtual layer, middleware, database, application layer, application and the like to identify possible monitoring requirements. In this regard, the probes scan the environment to determine downstream services that effect the component and the upstream services effected by the component and the set-up/configurations associated with those services. Once the services and corresponding configurations have been identified, the appropriate monitors can be determined. In addition, the systems, apparatus, methods, and computer program products herein described below provide for automatically determining the monitoring configurations associated with the monitors based at least historical behavior/performance of the same or similar components in the computing environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for objectively and automatically defining monitors associated with a component (i.e., application/software, middleware, hardware or the like) to be implemented with a computing environment infrastructure. The monitors may be transitional monitors responsible for monitoring connections between components and/or sub-components residing on various nodes within the computing environment or, in other embodiments of the invention, the monitors may hierarchical (e.g., top-level) monitors responsible for correlating and confirming information received by a component.

The present invention relies on deploying, on demand, one or more probes that scan through various layers of the computing environment infrastructure, such as the hardware, the network, storage, operating systems, virtual layer, middleware, database, application layer, application and the like to identify possible monitoring requirements. In this regard, the probes scan the environment to determine downstream services that effect the component and the upstream services effected by the component and the set-up/configurations associated with those services. In addition, the probes are configured to identify matches between interactions of the probes against a database of atypical interactions between component sub-components to aid in the determination of the monitors.

In addition to determining which monitors are required, embodiments of the present invention, determine the monitoring configurations (e.g., thresholds, iterations/cycles, downstream and upstream dependent service parameters and the like) for the identified monitors. Determining the monitoring configurations may be based on deployment of the probes, which are configured to gauge the effective and optimal configurations/thresholds for the identified monitors and historical behavior of the same or similar components implemented in the computing environment. In this regard, specific embodiments of the invention may rely on a learning environment in which the most adequate and/or optimal monitoring configurations can be automatically determined based on the deployment of the probes and historical behavior/performance of other implementations of the specific component and/or other implementations of similar components. Moreover, in further embodiments of the invention, once the monitors have been identified and implemented to assess the performance of the components, further learning based on the ongoing historical performance of the component and, in some embodiments historical performance of other same or similar components is relied upon to refine or redefine the monitoring configurations over time so as to insure that the monitors and their respective configurations are accurate (i.e., limit or eliminate the failure to identify a critical issue related to the component and/or a false positive causing an alert/notification to be issued when one is not justified).

As such, the automated determination of monitors and their corresponding configurations herein described addresses the technical problem associated with the subjective nature of manually defining the monitors, which is inefficient and inaccurate. In this regard, through the automated methodology herein described which deploys probes to scan the various layers of the overall computing environment infrastructure, the present invention is able to systematically determine which monitors need to be implemented for a specific component (software application, middleware, hardware or the like) prior to deploying the component in the computing environment. Such a systematic approach lends itself to consistency and accuracy in making sure that the monitors that are implemented are the optimal and most effective monitors. Moreover, the present invention provides for automated determination of the monitor configuration based on probe results and historical behavior/performance of the monitors. Thereby, creating a technical solution for insuring that the monitor configurations are the most effective and optimal so as mitigate and in some instances eliminates problems with critical issues that aren't monitored or monitored correctly going undetected or unreported or, conversely, having false positives result in reporting issues that otherwise are not issues and/or do not require reporting.

Figure 1:
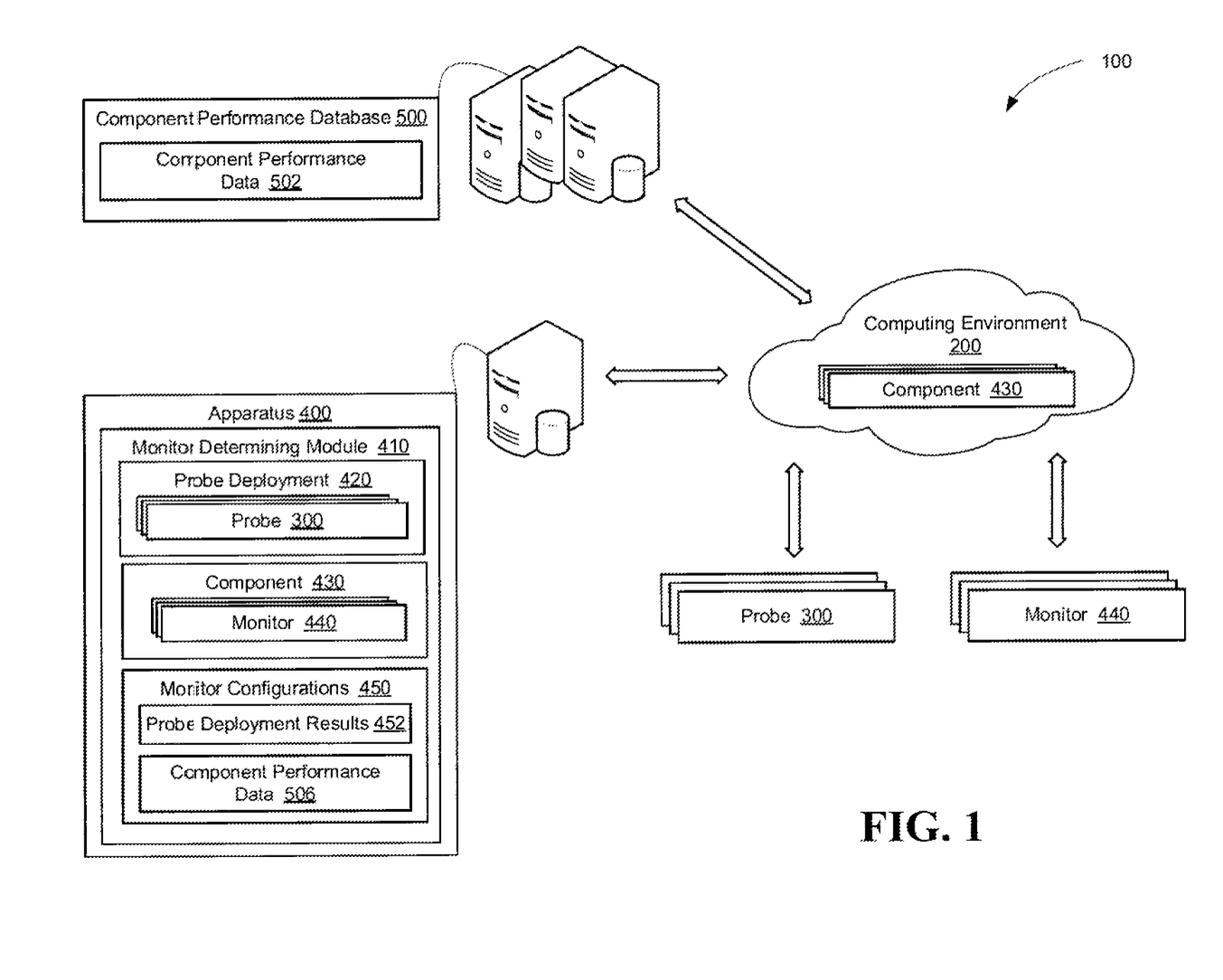
FIG. 1 provides a schematic diagram of an exemplary system for defining and implementing performance monitoring requirements within a computing environment infrastructure, in accordance with embodiments of the present invention.

Referring to FIG. 1, a schematic diagram is provided of a system 100 for defining and implementing performance monitoring requirements within a computing environment, in accordance with embodiments of the present invention. The system 100 is implemented amongst a computing environment 200, such as an enterprise-wide computing environment or the like. The computing environment 200 includes a plurality of components 430, such as software/applications, middleware, hardware or the like that are awaiting implementation into the computing environment 200 or currently implemented in the computing environment 200. The system includes a plurality of probes 300, with each of the probes associated with at least one classification or type of component 430 implemented in the computing environment 200 (such as, a classification type of software/application, a classification/type of middleware, a classification/type of hardware or the like). Additionally, the probes 300 include one or more scripts that are configured to identify monitors 440 associated with a component of the computing environment 200. A monitor 440 is any mechanism that continuously monitors or otherwise tracks the performance of a component 430 and provides the ability to trigger an action, such notifying users, via alerts of the like, when a predetermined critical issue occurs.

System 100 additional includes apparatus 400 which stores monitor determining module 410 that is configured to automatically identify, on demand, proposed monitor 440 for a monitoring a specified component 430 of the computing environment 200. In this regard, the monitor determining module 410 is configured to deploy 420 one or more of the plurality of probes 300 to scan at least a portion, and in some embodiments, the entire computing environment 200 to identify the one or more monitors 440.

In specific embodiments of the system, the monitor determining module 410 is further configured to determine monitor configurations 450 for each of the identified monitors 440. The monitor configurations 450 may include, but are not limited to, thresholds at which actions are taken, number of cycles/iterations which need to occur prior to taking an action, and other upstream and/or downstream service settings that may be tested/monitored as a result of meeting/exceeding a designated threshold and/or a designated number of cycles/iterations. The monitor configurations may be based on probe deployment results 452, which may be configured to gauge the effective and optimal threshold for an identified monitor 440 and same or similar component performance/behavior data 506. In such embodiments of the invention, the monitor determining module 410 is configured to access one or more component performance databases 500 to retrieve and assess the same or a similar component performance/behavior data 506. The same or similar component may be currently implemented in the computing environment 200 or previously implemented in the computing environment. In response to identifying and subsequently determining which monitors 440 to apply to a corresponding component 430 and determining the monitoring configurations 450 associated with the monitor 440, the monitors 440 may be applied to the component 430.

Figure 2:
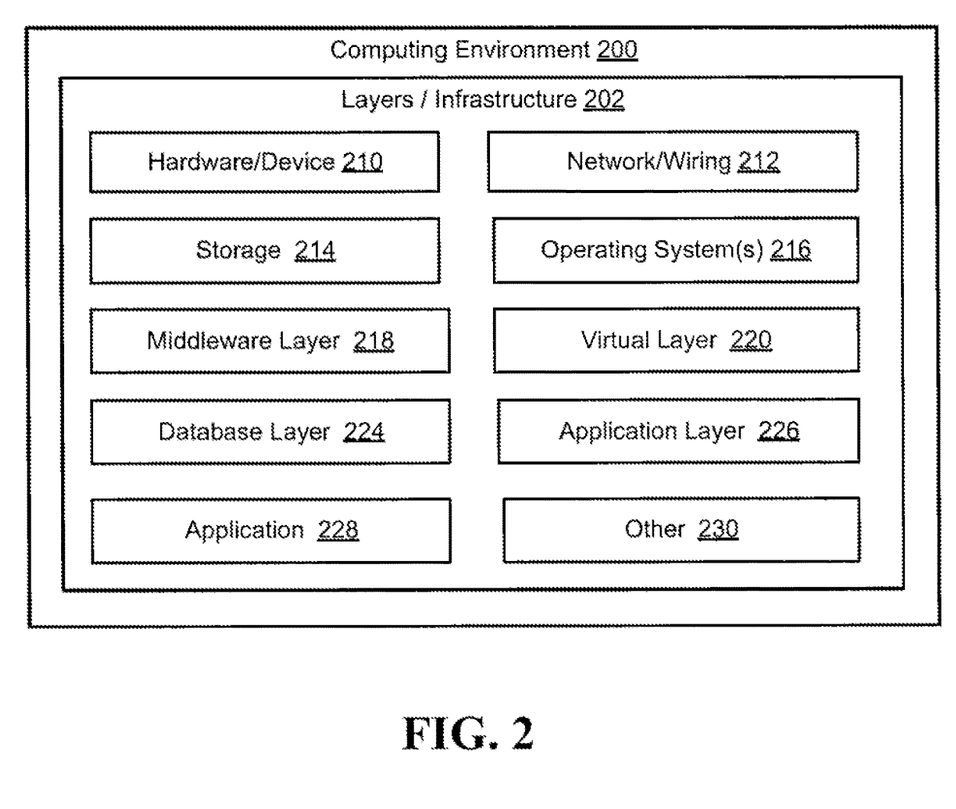
FIG. 2 provides a schematic diagram of a layers/infrastructure within a computing environment for deployment of probes, in accordance with embodiments of the present invention.

Referring to FIG. 2 a schematic diagram is shown of the computing environment 200 including the various layers/infrastructure 202 of the computing environment 200 to which the probes 300 (of FIG. 1) may be deployed. In accordance with the illustrated embodiment of FIG. 2 the layers/infrastructure 202 includes hardware/devices 210, which includes servers or the like; network/wiring infrastructure 212, which may include both wired and wireless portions of a computing network; storage 214, which may actual physical storage as well as virtual/cloud storage; operating system(s) 216; middleware layer 218; virtual layer 220, database layer 224; application layer 226; application 228 and any other 230 known or future known layer/infrastructure element. In specific embodiments of the invention, the probes 300 are deployed to all of the various layers/infrastructure 202 of the computing environment 200. In this regard, the present invention identifies monitors with respect to the entire computing environment including each and every layer or infrastructure 202 element of the computing environment 200. In other specific embodiments of the invention, the probes 300 are deployed/pointed to specific portions of the various layers/infrastructure 202 of the computing environment 200. In such embodiments of the invention, the monitor determining module 410 may be configured to determine which portions of the various layers infrastructure the probes should be deployed to based on the classification/type of the monitor 440.

Figure 3:
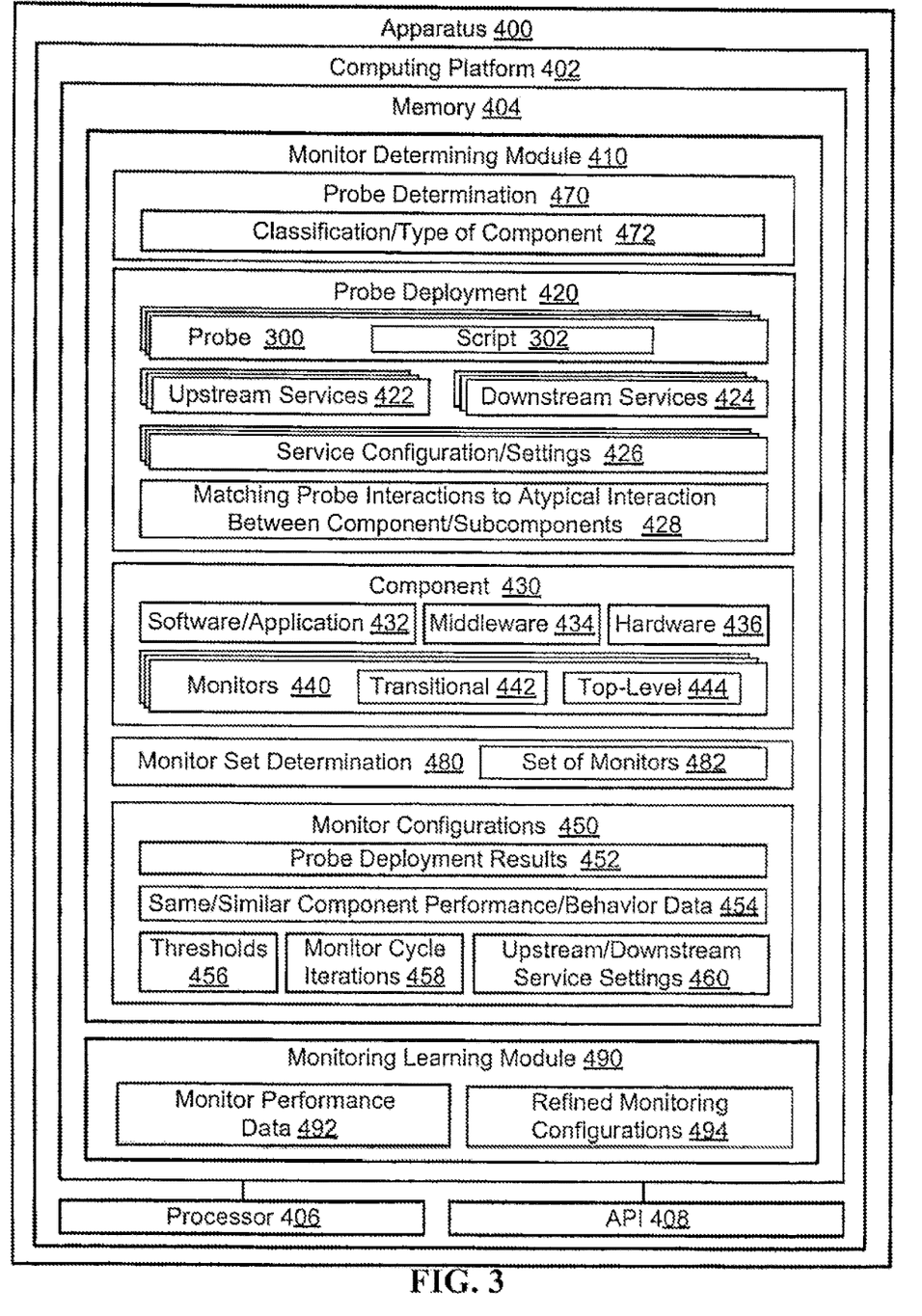
FIG. 3 provides a block diagram of an apparatus for defining and implementing performance monitoring requirements within a computing environment infrastructure, in accordance with embodiments of the present invention.

Referring to FIG. 3 a block diagram is presented of an apparatus 400, which is configured for defining and implementing performance monitoring requirements within a computing environment, in accordance with embodiments of the present invention. In addition to providing greater detail, FIG. 3 highlights various alternate embodiments of the invention. The apparatus 400 may include one or more of any type of computing device, such as one or more servers, personal computers or the like. The present apparatus and methods can accordingly be performed on any form of one or more computing devices.

The apparatus 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes processor 406, which may be an application-specific integrated circuit ("ASIC"), or other chipset, processor, logic circuit, or other data processing device. Processor 406 or other processor such as ASIC may execute an application programming interface ("API") 408 that interfaces with any resident programs, such as monitor determining module 410, monitoring learning module 490 and routines, sub-modules associated therewith or the like stored in the memory 404 of the apparatus 400.

Processor 406 includes various processing subsystems (not shown in FIG. 3) embodied in hardware, firmware, software, and combinations thereof, that enable the functionality of apparatus 400 and the operability of the apparatus on a network. For example, processing subsystems allow for initiating and maintaining communications and exchanging data with other networked devices, such as the databases and servers shown in FIG. 1. For the disclosed aspects, processing subsystems of processor 406 may include any subsystem used in conjunction with monitor determining module 410, monitoring learning module 490 and related algorithms, sub-algorithms, modules, sub-modules thereof.

Computer platform 402 may additionally include communications module (not shown in FIG. 3) embodied in hardware, firmware, software, and combinations thereof, that enables communications among the various components of the apparatus 400, as well as between the other networked devices. Thus, communication module may include the requisite hardware, firmware, software and/or combinations thereof for establishing and maintaining a network communication connection.

The memory 304 of apparatus 300 stores monitor determining module 410 which is configured to determine monitors for components of a computing environment, in accordance with embodiments of the present invention.

In specific embodiments of the invention, the monitor determining module 410 may include probe determination 470 that is configured to automatically determine which probes 300 to deploy based at least on the classification and/or type of component 472. In such embodiments of the invention, automatic determination of probes may obviate the need for manual selection of the probes and/or may be used in combination with manual selection (i.e., a user may add or subtract from the determined set of probes). For instance, in those embodiments in which the component is a software application, a particular set of probes may be applicable to a particular classification/type of application or a particular set of probes may be applicable to a specific hosted computing environment. For example, in a computing environment running a specified operating system and hosted on a virtual cloud-based model, a specific set of probes may be applicable for deployment in determining monitors for the application.

As previously discussed in relation to FIG. 1, the monitor determining module 410 includes probe deployment 420 that is configured to deploy one or more probes 300, which include to scan at least a portion, and in some embodiments of the invention the entirety, of the computing environment (i.e., all layers/infrastructure). Each of the probes 300 include one or more scripts 302, which are executed to identify one or more monitors 300 associated with a component 430 of the computing environment. In specific embodiments of the invention the probes 300 may be intrusive and/or non-intrusive probes. Intrusive probes are defined as probes that require an authentication mechanism in order to scan at least a portion of the computing environment.

As previous discussed, the component 430 may include but is not limited to software application 432, middleware 434 or hardware 436. Further. The monitors 440 may comprise transitional monitors 442 configured for monitoring connections between components and other components residing on various nodes within the computing environment. In other embodiments of the invention, the monitors may be hierarchical monitors, such as top-level monitors or the like, that are configured to correlate and/or confirm information gathered at or by the component 430.

In alternate embodiments of the invention, the monitor determining module 410 includes monitor set determination 480 that is configured to determine a set of monitors 482 from amongst the identified monitors 440. In this regard monitor set determination 480 determines the correct combination of monitors 440 based on the monitoring requirements, monitor specifics and the like.

In specific embodiments of the invention, the probes 300 are configured to identify the monitors 440 based on determining one or more upstream services 422 that are affected by the component 430 and/or one or more downstream services 424 that have an effect on the component 430; in addition to the service configurations and/or settings 426 associated with the determined upstream and downstream services 422, 424. In further embodiments of the invention, the probes 300 are configured to identify the monitors 440 based on matching probe interactions 428 to atypical interactions between components or corresponding subcomponents.

Additionally, as previously noted, monitor determining module 410 is configured to determine monitor configurations 450 for the identified monitor 440 and/or the monitors in the determined monitor set 482. Monitor configuration determination may be based on probe deployment results, such as gauging the effective and optimal thresholds, and historical performance/behavior data 454 of the same or similar components currently or previously implemented in the computing environment. By employing historical performance/behavior data 454 the most effective and/or optimal monitoring configurations may be determined at the onset (e.g., during onboarding of the component prior to test and/or production phase use of the component)

The monitoring configurations 450 may include, but are not limited to, thresholds 456 that trigger an action (i.e., an alert/notification, further iterations of monitoring, and/or testing/monitoring downstream and/or upstream service parameters or the like), Further, the monitor configurations 450 may include monitor cycle iterations that trigger an action (the number of monitoring cycles that trigger an alert/notification and/or testing/monitoring downstream and/or upstream service parameters or the like). In addition, the monitor configurations 450 may include upstream/downstream service parameters (i.e., other upstream and/or downstream service parameters that need to be tested/monitored in the event of a threshold being met or a threshold being met after a predetermined number of monitoring cycle iterations). For example, a monitor is configured to monitor the response time for returning a webpage and a threshold of 8 milliseconds is set, if the first monitoring cycle iteration results in time greater than 8 milliseconds, the monitor may be configured to wait five seconds and monitor the same webpage again. If after the second monitoring cycle iteration the response time is still greater than 8 milliseconds, the monitor may be configured to monitor/test two downstream and/or upstream services to see if those services have been delayed. If the monitoring/testing of the upstream/downstream dependent services indicates a requisite delay (based on a predetermined threshold), an alert/notification may be generated and communicated to designated entities within the enterprise. Since the monitoring configuration 450 is based on objective factual data, the monitoring configurations are more accurate in terms of being the most effective and optimal configurations for the monitor (in other words, the alerts/notifications are only being generated and communicated when an actual critical issued exists or is about to exist and false positives are mitigated or, in some instances, eliminated so that alerts/notifications are not communicated when, in fact a critical issue has not occurred or is not about to occur.)

In further embodiments of the invention, the memory 404 of apparatus 400 may include monitoring learning module 490 that is configured to obtain monitor performance data 492 from an implemented monitor and based on the performance data and, in some embodiments, historical performance/behavior data of same or similar monitors 454, refine monitoring configurations 494. In specific embodiments of the invention, such refining the monitoring configurations 494 may occur dynamically (i.e., as components 430 are being monitored, while in other embodiments of the invention refining/redefining monitor configurations 494 may occur at predetermined intervals or on an ad hoc basis. In this regard, the monitoring learning module 490 may implement heuristic analysis or the like in determining when monitoring configurations 450 should be refined/redefined 494 and the degree to which monitoring configurations 450 should be refined/redefined. Further, such assessment at the monitoring learning module 490 may result in a monitor being re-classified and/or re-categorized, as need be.

Thus, systems, apparatus, methods, and computer program products described above provide for objectively defining monitors associated with a component (i.e., application/software, middleware, hardware or the like) to be implemented with a computing environment infrastructure. The present invention relies on deploying, on demand or the like, one or more probes that scan through various layers of the computing environment infrastructure, such as the hardware, the network, storage, operating systems, virtual layer, middleware, database, application layer, application and the like to identify possible monitoring requirements. In this regard, the probes scan the environment to determine downstream services that effect the component and the upstream services effected by the component and the set-up/configurations associated with those services. Once the services and corresponding configurations have been identified, the appropriate monitors can be determined. In addition, the systems, apparatus, methods, and computer program products herein described below provide for automatically determining the monitoring configurations associated with the monitors based at least historical behavior/performance of the same or similar components in the computing environment While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for defining and implementing performance monitoring requirements within a computing environment infrastructure, the system comprising;

a plurality of probes, each probe associated with at least one classification of a component of the computing environment infrastructure and including one or more scripts configured to identify monitors associated with a component of the computing environment; and a monitor determination module, stored in memory, executable by a processor and configured to:

determine which probes from the plurality of probes to deploy based at least on component classification and component type associated with a component;

deploy one or more of the determined probes to scan at least a portion of the computing environment and identify (i) one or more monitors associated with the component of the computing environment and (ii) dependent services that are downstream and upstream of the component; and determine configuration settings for the one or more identified monitors and at least one of the dependent services that are downstream and upstream of the component, wherein the configuration settings include a threshold associated with a component parameter, wherein exceeding the threshold triggers monitoring one or more of the at least dependent services using the determined configuration settings of the at least dependent service.

2. The system of claim 1, wherein the plurality of probes are further configured to identify monitors with respect to which layers of the computing environment the probes are deployed.

3. The system of claim 1, wherein the monitor determination module is further configured to deploy one or more of the probes to scan an entirety of the computing environment, wherein an entirety includes at least a computing environment infrastructure including a network, hardware devices and storage, one or more operating systems, a virtual layer, a middleware layer, a database layer, an application layer and one or more applications.

4. The system of claim 1, wherein the monitoring determination module is further configured to determine the one or more of the probes based at least on a type of the component of the computing infrastructure associated with the monitoring.

5. The system of claim 1, wherein the monitoring determination module is further configured to determine one or more portions of the computing environment to scan based at least on a type of the component of the computing infrastructure associated with the monitoring.

6. The system of claim 1, wherein the plurality of probes are further configured to identify monitors associated with the component of the computing environment by determining one or more services offered by the component of the computing environment and a configuration of the one or more services in the computing environment.

7. The system of claim 6, wherein the monitor determination module is further configured to identify the one or more monitors associated with a component of the computing environment by determining the one or more services offered by the component of the computing environment and a configuration of the one or more services in the computing environment.

8. The system of claim 1, wherein the plurality of probes include non-intrusive probes and intrusive probes, wherein intrusive probes are configured to require an authentication mechanism in order to scan the at least a portion of the computing environment.

9. The system of claim 1, wherein the monitor determination module is further configured to combine the one or more monitors to determine a set of monitors to apply to the component of the computing environment.

10. The system of claim 1, further comprising a performance monitoring database that is configured to store historical performance data associated with components of the computing environment.

11. The system of claim 10, wherein the monitor determination module is further configured to determine the configuration settings based on the component of the computing infrastructure associated with the monitoring and accessing the performance monitoring database to assess historical performance data associated with a same component of the computing environment or a similar component of the computing environment.

12. The system of claim 1, wherein the monitor determination module is further configured to determine the configuration settings for the one or more identified monitors, wherein the configuration settings include a second threshold associated with a second component parameter, wherein exceeding the second threshold triggers notifying one or more entities associated with the computing environment infrastructure.

13. The system of claim 1, wherein the monitor determination module is further configured to determine the monitor configuration settings for the one or more identified monitors, wherein the configuration settings include number of monitoring cycle iterations that trigger an action.

14. The system of claim 13, wherein the monitor determination module is further configured to determine the configuration settings for the one or more identified monitors, wherein the configuration settings include number of monitoring cycle iterations that trigger the action, wherein the action includes at least one of notifying one or more entities associated with the computing environment infrastructure or monitoring additional downstream or upstream dependent services in the computing infrastructure.

15. The system of claim 1, further comprising a monitoring learning module, stored in memory, executable by a processor and configured to learn, over time, monitoring performance data associated with one or more of the identified monitors that have been applied to the component of the computing environment and refine configuration settings associated with the component based on the monitoring performance data.

16. The system of the claim 1, wherein the component of the computing environment comprises one of a hardware component, a software component or a middleware component.

17. An apparatus for defining and implementing performance monitoring requirements within a computing environment infrastructure, the apparatus comprising;

a computing platform including a memory and at least one processor in communication with the memory; and a monitor determination module, stored in the memory, executable by at least one of the one or more processors and configured to:

determine which probes from a plurality of probes to deploy based at least on component classification and component type associated with a component;

deploy one or more of the determined probes to scan a portion of the computing environment and identify (i) one or more monitors associated with the component of the computing environment and (ii) dependent services that are downstream or upstream of the component; and determine configuration settings for the one or more identified monitors and at least one of the dependent services that are downstream and upstream of the component, wherein the configuration settings include a threshold associated with a component parameter, wherein exceeding the threshold triggers monitoring one or more of the at least dependent services using the determined configuration settings of the at least dependent service.

18. A computer program product for defining and implementing performance monitoring requirements within a computing environment infrastructure comprising a non-transitory computer-readable storage medium having computer-executable instructions for:

determine which probes from a plurality of probes to deploy based at least on a component classification and component type associated with a component;

deploying one or more of the determined probes to scan a portion of the computing environment;

in response to the scan, identifying (i) one or more monitors associated with the component of the computing environment and (ii) dependent services that are downstream or upstream of the component;

determine configuration settings for the one or more identified monitors and at least one of the dependent services that are downstream and upstream of the component, wherein the configuration settings include a threshold associated with a component parameter, wherein exceeding the threshold triggers monitoring one or more of the at least dependent services using the determined configuration settings of the at least dependent service.

* * * * *